May 10, 1927.
C. E. HAMILTON
CUTTING TOOL.
Filed Jan. 14, 1925
1,628,315
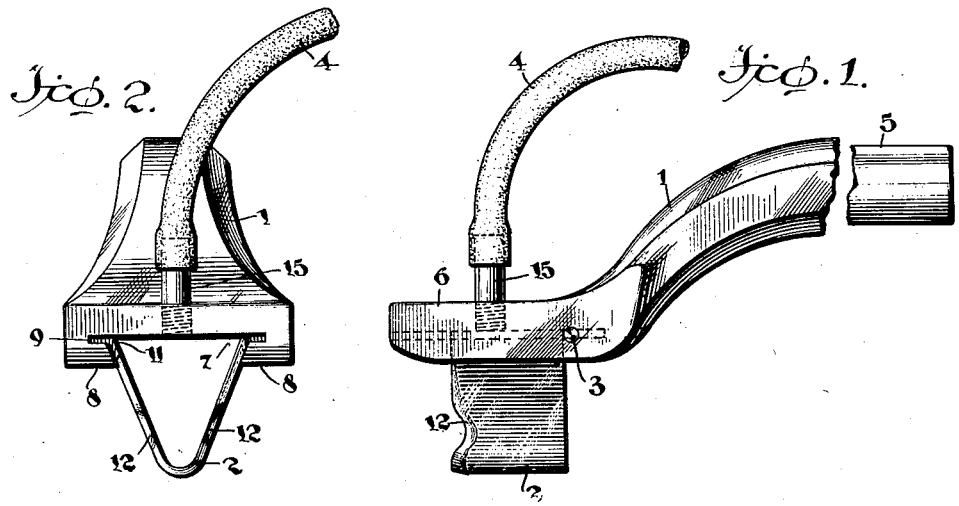
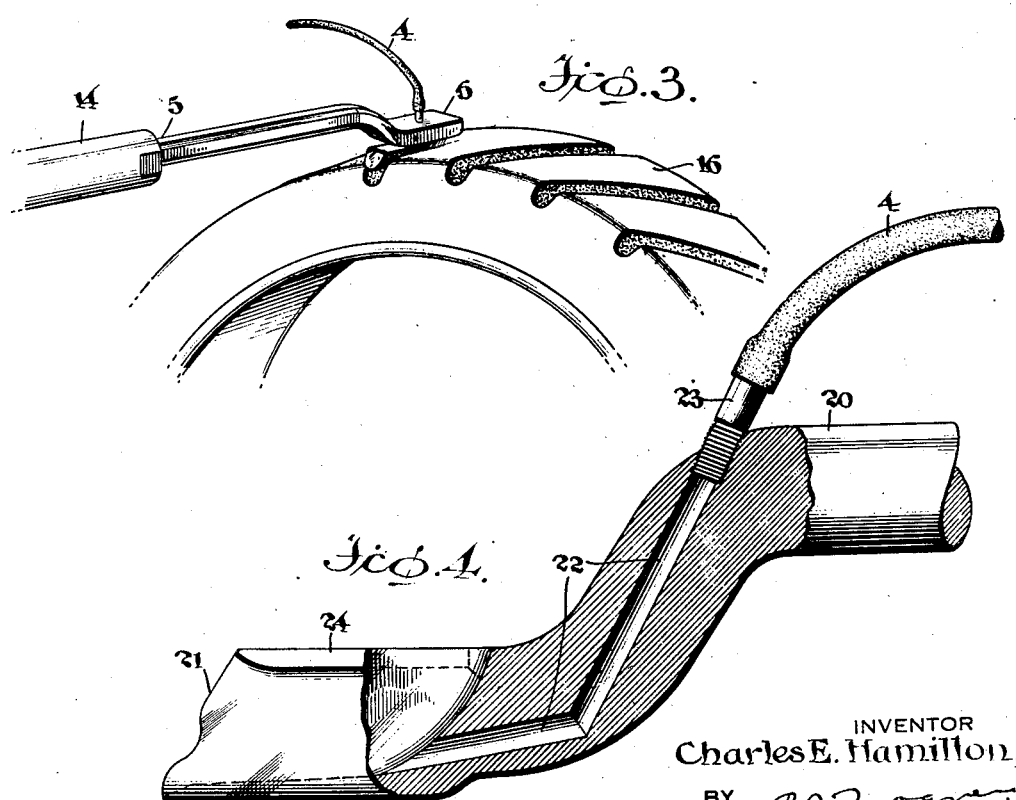
INVENTOR
Charles E. Hamilton,
BY
ATTORNEY Patented May 10, 1927.

1,628,315

UNITED STATES PATENT OFFICE.

CHARLES E. HAMILTON, OF AKRON, OHIO, ASSIGNOR TO THE GOODYEAR TIRE & RUBBER COMPANY, OF AKRON, OHIO, A CORPORATION OF OHIO.

CUTTING TOOL.

Application filed January 14, 1925. Serial No. 2,370.

This invention relates to cutting tools that may be employed for cutting designs in vulcanized rubber and particularly to tools adapted to cut tread designs in the tread portions of finished vehicle tires or for regrooving such tire treads after the original tread configurations have become worn. More particularly, it pertains to rubber cutting tools that are actuated by a percussion hammer.

In the employment of tools of the above designated type, the blade element thereof is subjected to blows of great intensity from a percussion hammer by means of which the cutting tool is driven into the rubber. It is found in practice that the blades very frequently break because of the heat developed during the cutting action or that the edge is turned, which requires frequent resharpening. It is also true that tools of the types heretofore proposed cannot be operated as rapidly nor can they be guided with the degree of precision that is desirable to secure the full advantage of tools embodying this invention.

In its simplest form, this invention contemplates a cutting tool of the above class that incorporates means adapted to direct a lubricant, such as water or soap solution, directly to the cutting portion of the tool, thereby greatly facilitating the operation of the tool and providing a cutting device that may be operated with greater precision, more rapidly and at far less expense incident to blade sharpening and replacement than in tools heretofore proposed for this general service.

Fig. 1 of the accompanying drawing is a side elevational view, with portions broken away, of a cutting tool embodying this invention;

Fig. 2 is an end elevational view of the tool shown in Fig. 1;

Fig. 3 is a perspective view showing the tool in arrested operation; and

Fig. 4 is a side elevational view, shown partially in section with parts broken away, of a modified form of tool embodying this invention.

The cutting tool shown in Fig. 1, Fig. 2 and Fig. 3 of the accompanying drawings, comprises a holder 1 that is adapted to removably receive a cutting element 2, which seats against an abutment 3. A lubricant-supply tube 4 is connected to the tool holder adjacent the cutting element of the tool. The holder 1 comprises a body portion having a handle 5 at one end and a relatively wide blade supporting head 6 formed on the other end. The under face of the head 6 of the tool has a longitudinal recess or U-shaped channel 7 formed therein which provides a pair of depending side portions 8, each of which is undercut at its base by longitudinal grooves 9 that extend into the base of the depending members 8 and merge with the channel 7 at the shank of the tool head.

In order to support the driven portion of the cutting element 2, a pair of dowel pins are utilized, forming the abutment E in the head of the tool against which the upper trailing or driven portions of the blade 2 seat and from which the tool is driven. The abutment also prevents the blade from being torn from the tool or distorted during the cutting operation.

The cutting element or blade 2, which is preferably adapted to be removably supported in the head of the tool, has a pair of side flanges 11 that extend laterally from the base of the tool and that are adapted to seat within the longitudinal grooves of the tool head in such manner that the cutting element may be slid longitudinally of the head to a seating position against the abutment 3. The cutting element 2 is preferably of thin smooth flexible steel having a cutting edge 12 and a trailing edge 13, the top of which engages the abutment 3 from which the tool is driven by blows that are imposed against the handle 5 of the tool by a percussion hammer 14, a portion of which is shown in Fig. 3.

The head of the tool has a threaded hole extending therethrough in the vicinity of the cutting element which is adapted to receive a liquid supply nipple 15 that is connected to the flexible supply tube 4, through which water or soap solution may be conveyed to the cutting edge of the tool for the purpose of cooling and lubricating the tool during its operation. The position of the liquid supply nipple 15 in the tool head is preferably adjacent the cutting edge of the tool.

Fig. 3 of the accompanying drawings is a perspective view illustrating the cutting tool in operation. The tool is preferably driven by means of a pneumatic percussion hammer 14 that imposes rapidly recurrent blows upon the handle 5 of the tool to thereby force the cutting edge of the tool 12 through the material of the tread face of a vulcanized rubber vehicle tire 16, a portion of which is shown in the drawings. The flexible tubing 4 is connected to a suitable supply of lubricating and cooling liquid in such manner that a sufficient quantity of liquid to properly lubricate and cool the cutting edge of the tool is permitted to flow through the liquid supply nipple 15 into the cut that is being made by the tool. The action of the percussion cutting tool is such that, with each blow, the rubber springs somewhat open adjacent the cutting edge and permits the water, or such other lubricant as may be used, to penetrate the cut that is being made in the tread portion of the tire.

The modified form of tool shown in Fig. 4 comprises a cutting element that is integral with the body portion of the tool. The tool shank 20 terminates in a channel shaped cutting element 21 to which lubricating and cooling liquid is supplied through a channel 22 from a liquid supply nipple 23. A pair of overhanging guide ears 24 limits the depth of cut made by the tool. A tool of this type is also intended to be driven by a percussion hammer, such as that indicated at 14.

A tool of the proposed type can far more readily be directed along the tread portion of the tire with a greater degree of accuracy and precision than has heretofore been possible with tools of this nature. The use of a lubricant in connection with the cutting of grooves in the tread portion of a vehicle tire greatly prolongs the life of the cutting blade 2 and renders it possible to complete the regrooving of the tread face of a tire in a relatively short time; whereas, such operation was heretofore greatly prolonged and was a relatively expensive operation because of the required frequent resharpening and breaking of blades, which are of peculiar form and which, although not expensive, add materially to the cost of regrooving vehicle tires.

Although I have illustrated only two desirable forms of my invention, it is to be understood that the invention is not to be limited to the specific forms of tools shown, but is to be extended to other tools for use in connection with the cutting of grooves in vehicle tires within the spirit and scope of the appended claims.

What I claim is:

1. A tire regrooving tool comprising a holder adapted to retain a cutting blade, and a lubricant conducting tube positioned over the blade and communicating therewith through the holder to permit the flow of fluid evenly to all parts of the blade during operation of the tool.

2. A tire regrooving tool comprising a holder adapted to receive a V-shaped cutting tool and a lubricant conducting tube positioned over the apex of the blade to permit the flow of fluid evenly to all parts of the blade.

3. A rubber cutting tool adapted to be driven by a percussion hammer comprising a holder provided with grooves for the reception of securing lugs formed on a curved cutting blade, and a lubricating duct formed in the mid portion of the holder to introduce lubricant evenly to all portions of the blade.

In witness whereof, I have hereunto signed my name.

CHARLES E. HAMILTON.